United States Patent [19]

Rubin

[11] Patent Number: 4,527,895

[45] Date of Patent: Jul. 9, 1985

[54] METHOD OF CHARACTERIZING THE COLORED APPEARANCE OF A GEMSTONE

[75] Inventor: Howard Rubin, Bayside, N.Y.

[73] Assignee: GemDialogue Systems, Inc., Bayside, N.Y.

[21] Appl. No.: 460,761

[22] Filed: Jan. 25, 1983

[51] Int. Cl.³ .................. G01J 3/52; G01N 21/87
[52] U.S. Cl. ........................... 356/30; 356/421
[58] Field of Search .............. 356/30, 243, 416, 421, 356/422, 423, 424, 425; 434/98, 99, 100, 386; 63/26, 32

[56] References Cited

U.S. PATENT DOCUMENTS

| | | | |
|---|---|---|---|
| 1,597,830 | 8/1926 | Rueger | 356/422 |
| 1,612,791 | 1/1927 | Ames et al. | 356/422 |
| 1,617,024 | 2/1927 | Munsell et al. | 434/98 |
| 2,007,264 | 7/1935 | Allen | 434/98 |
| 3,474,546 | 10/1969 | Wedlake | 434/98 |

FOREIGN PATENT DOCUMENTS 2036360 6/1980 United Kingdom .............. 356/30

Primary Examiner—F. L. Evans
Assistant Examiner—Joel L. Harringa
Attorney, Agent, or Firm—Cohen, Pontani & Lieberman

[57] ABSTRACT

The inventive method, which provides an accurate, objective and readily reproduceable characterization of the total colored appearance of a gemstone, includes the steps of identifying the main and overlay colors of an illuminated gemstone from among a predetermined set of primary colors by comparison of the stone with a series of reference color charts representing standard samples of the primary colors and of composite mixtures of the primary colors, identifying by comparison the proportion of overlay color to main color in each stone with respect to such proportion in the selected color chart to determine the overlay level, identifying the color saturation of the composite coloration of the gemstone by comparison with the selected color chart to determine the zone of coloration of the stone, and overlaying a color mask and the selected color chart to identify the degree of color masking present in the gemstone.

14 Claims, 1 Drawing Figure

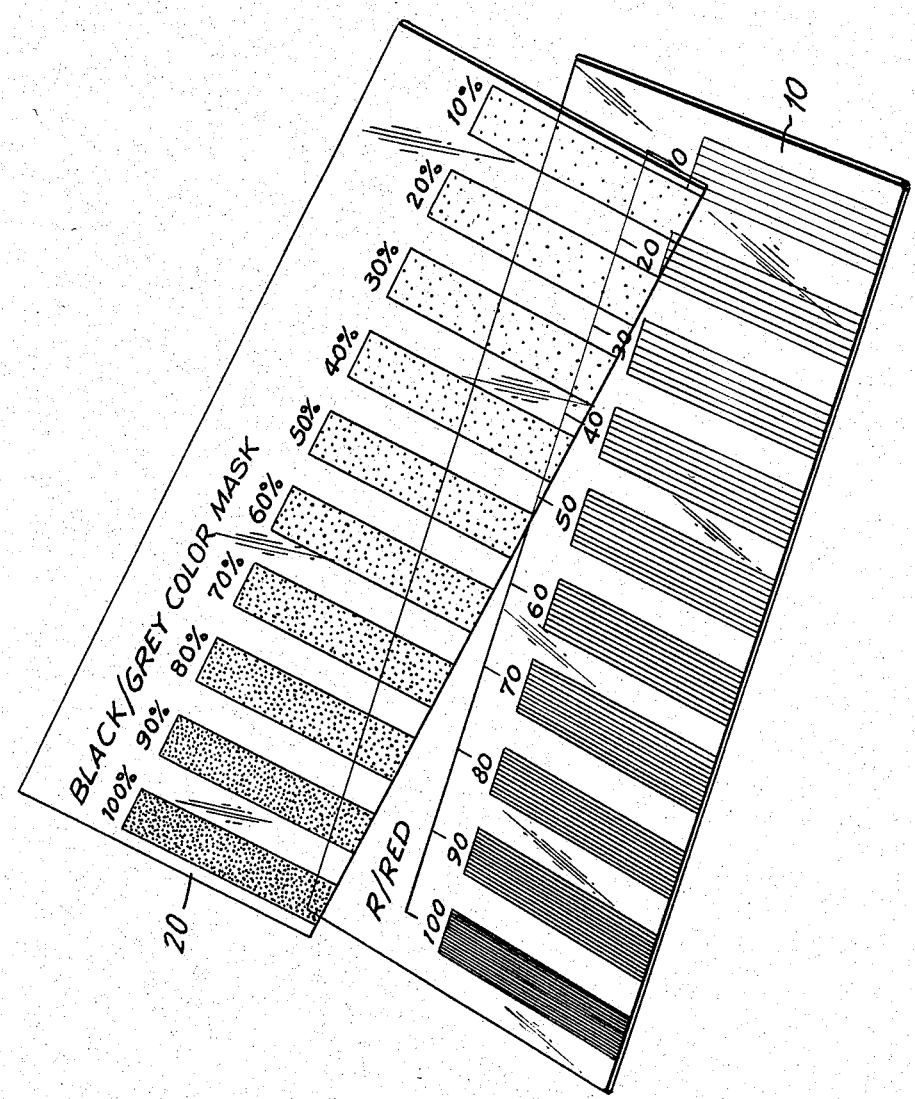

METHOD OF CHARACTERIZING THE COLORED APPEARANCE OF A GEMSTONE

BACKGROUND OF THE INVENTION

This invention relates generally to methods for assembling a set of defining parameters relating to certain physical characteristics of a gemstone and, more particularly, to a method of identifying and specifying the total colored appearance of a gemstone in an objective and independently repeatable manner.

A major difficulty frequently encountered by those professionally or personally involved with the handling of colored gemstones—such as gem dealers, jewelers and gemologists—is the almost totally subjective manner in which the overall colored appearance of such stones is typically described. Color names are most often assigned to a particular stone to enhance its merchantability rather than for the purpose of objectively specifying its appearance within the framework of an accurate and independently verifiable set of characteristic parameters. Some color designations common in the gem trade are merely intended to subliminally suggest a particular mood and can thus denote a wide range of shading or tints—such as blushing rose, glowing coral, azure blue and forest green. Even that nomenclature said to identify standard colors for particular stones—such as angel skin or ox blood for coral, pigeon blood for ruby, apple green for jade, and grass green or leaf green for emerald—in fact corresponds to varied shades or tints for different people whose individual experiences tend to affect their own interpretations.

The common use of these highly subjective terms to describe the color of gemstones frustrates the desire of a jeweler or gemmologist to best serve the customer. When a stone is lost, the ability to recognize and obtain a replacement stone of suitably close color match to the original is practically impossible absent direct comparison with a companion stone from the same article of jewelry. A uniform system of color grading would permit ready replacement of a lost gemstone with one practically identical in overall color characteristics and appearance, without the need to directly examine companion pieces or stones. A gem dealer could also better advise a customer in connection with new purchases by retaining a listing of parameters and values providing an objective and repeatable indication of the color of gemstones already owned by the customer.

OBJECTS OF THE INVENTION

It is therefore the desideratum of the present invention to provide a reliably objective and independently verifiable and repeatable method of uniformly and accurately identifying the overall colored appearance of a gem stone.

It is another object of the invention to provide such a method that yields a set of characteristic parameters uniquely identifying the overall colored appearance of the gem stone.

An additional object of the invention is to provide a convenient format of comparison charts with respect to which objective determinations of the parameters representing the overall colored appearance of the gemstone may be identified and specified.

Further objects, features and advantages of the present invention will be more fully appreciated by reference to the following detailed description of a presently preferred, but nonetheless illustrative, embodiment in accordance with the present invention.

BRIEF DESCRIPTION OF THE DRAWING

The FIGURE illustrates color charts and a masking chart operatively interposed for use in accordance with the present invention.

DETAILED DESCRIPTION OF THE PREFERRED EMBODIMENT

The instant invention presents a system and methodology for designating an essential and fundamental characteristic of a gemstone—its coloration or, more accurately, its total colored appearance—that has historically been specified on an almost wholly subjective, and therefore non-uniform and inconsistent, basis. The invention is particularly noteworthy in its ability to present a designation of the stone's colored appearance on the basis of factors or characteristics that can be objectively applied, thus enabling the method to be independently repeated and verified without variation in the resulting designations. The consequent uniformity provides a reliable system of classification by which the colored appearance of a gemstone can be uniquely characterized so that even without the stone itself, its total coloration is positively and accurately known.

Central to the invention is a recognition that the visual coloration of virtually any gemstone can be uniquely designated by specifying three basic parameters, respectively delineated herein as the main and overlay colors and the amount of color masking. The designation may be further refined by specifying additional details of or values associated with these three parameters, as well as of secondary characteristics of the stone. However, it is in the fact that an objective evaluation of these three basic parameters provide a composite result closely approximating the overall colored appearance of the stone—and the unusual simplicity of the method by which the identification of the relative values of these three parameters can be uniquely and objectively determined without sophisticated apparatus—that fundamental key to the invention lies.

The first of these basic parameters is the main or dominant color of the gemstone. We can, by way of example, define a predetermined set of a selected number of "pure" colors respectively along the visible color spectrum—red, orange, yellow, green, blue and purple—each corresponding to a particular point along the continuous spectrum, although the precise frequency of each is not important. These "pure" colors shall be delineated, for purposes of discussion, the primary colors. Although it is possible that a stone's coloration may correspond to precisely one of these predetermined color frequencies, more often its coloring will instead lie along the spectrum at a point between two of the adjacently positioned primary colors. As a consequence of the continuity of the visible color spectrum, the primary colors should be understood to blend or shade into one another as the spectrum is traversed.

Clearly, then, it is inadequate to attempt to catalog the visual coloration of a gemstone by identifying only its main color from among the selected set of primary colors. However, by further identifying a second parameter—designated herein as the overlay color—a more precise and useful characterization is obtained.

Color overlay accounts for the shading or blending of one primary color into another between their respective positions along the color spectrum. Thus, the main color identifies that color—from among the predetermined set of primary colors—that dominates the colored appearance of the gemstone. The term overlay, on the other hand, designates the particular primary color that is blended or mixed with, and in amount less than, the stone's main color. The overlay color therefore specifies the secondary coloration of the stone or, put another way, indicates the direction of required travel along the color spectrum from the main color to reach the frequency of the stone's composite coloration.

A specific example should prove illustrative. In a gemstone comprised of a mixture of the primary colors yellow and green, one of those colors constitutes the main color, while the other designates the overlay color. If yellow is more dominant in the stone (this combination can be denoted greenish yellow), then yellow is the main color and green the overlay color. Correspondingly, the main color of a yellowish green stone is green and its overlay color is yellow. There have accordingly now been defined four separate categories for stones having green and/or yellow elements of coloration—"pure" yellow, greenish yellow (yellow with green overlay), yellowish green (green with yellow overlay) and "pure" green.

These four composite colorations can be more precisely defined—to assure objectivity in practicing the methodology of the invention—by providing a sample swatch or patch of each to thereby define their respective positions along the continuous color spectrum. The intermediate color blends or mixtures between all of the other adjacent primary colors can be similarly defined by providing corresponding color comparison swatches therefor—between green and blue, blue and purple, purple and red, red and orange, and orange and yellow. To further enhance the usefulness and ready practice of the methodology of the invention, certain additional primary colors—cyan (comprising an equal mixture of blue and green), and magenta (comprising an equal mixture of red and blue)—may be likewise defined. Each primary color and composite combination of main colors should be represented or implemented, for purposes of direct comparison with the gemstone being studied, by a corresponding color swatch or sample patch.

Returning now to the earlier example of a gemstone having a composite coloration situate between yellow and green, the identification of its main and overlay colors can be more specified by enhanced precision by further defining the strength or amount of overlay color with respect to the main color. For this purpose, a fixed number of steps or levels can be selected—by way of example three such levels shall be assumed. Assuming a greenish yellow stone (main color yellow with green overlay), the standard greenish yellow swatch shall be defined as corresponding to level or step 2. If, upon comparison of the subject gemstone with the standard greenish yellow swatch, the coloration of the stone is observed to have less green in it than the sample swatch, the number 1 would be assigned to the step or level indicating overlay color strength. Should the stone appear to have more green than the sample swatch, the number 3 would be noted as the overlay color step. The overlay color will therefore be represented by both the primary color name and the number 1 for slight, the number 2 for moderate or the number 3 for strong, with the standard color swatch representing moderate strength.

This refinement of the overlay color identification in essence adds four additional categories of composite coloration, located at appropriate positions along the color spectrum between pairs of the primary colors. At the same time, however, it does not absolutely require the provision of additional sample swatches for the slight (level 1) and strong (level 3) amounts of overlay color, thereby minimizing the number of comparison charts that need potentially be consulted by a user of the inventive method and maintaining its ease of use.

The foregoing system and method of specifying the main and overlay colors thus encompasses the ability to accurately identify the relative strength of the overlay color with respect to the main color. In order to assure that the final specification of gemstone's coloration clearly and accurately represents its overall appearance so as to enable the stone to be matched given only the identifying parameters, it is further desirable to specify the strength or intensity of the composite coloration. For example, the coloration of a greenish yellow stone of overlay level 2 can be extremely strong or intense, or can conversely appear to be relatively washed out or light. The spectral color frequency of the composite is in either case the same; only the intensity or strength of the color mixture is different. A completely accurate identification of the stone's coloration will preferably include an indication of the strength of the color mixture.

Each single color swatch is accordingly expanded to constitute a color comparison chart, each chart comprising a series of a selected number of zones illustrating different strengths of the particular color combination. Thus, each chart may for example illustrate ten zones representing uniformly stepped degrees of strength or intensity of the color spectrum frequency of that particular chart. The strongest or most intense zone represents full or 100% color saturation, while the weakest or least intense zone in a ten zone chart will represent only 10% color saturation. Each chart—whether representing a pure primary color or a combination or composite mixture of primary colors—illustrates the particular spectral coloration of the chart in a plurality of saturation zones against which a gemstone under consideration can be readily compared. Thus, the FIGURE illustrates by way of example a color chart, designated by the general reference numeral 10 and shown as one of a series of such charts of various color combinations corresponding to the pure primary color red and stepped through ten zones of saturation or intensity.

The initial method steps of identifying the main and overlay colors of a gemstone in accordance with the invention therefore includes comparing the stone with the color comparison charts to initially identify the main and, where appropriate, overlay color thereof. The overlay level or step is then determined—by comparison with the appropriate standard color chart to ascertain whether the stone includes more, or less, or the same degree of overlay color with respect to main color as shown in the subject color chart. Finally, the strength or saturation of the gemstone's coloration is determined by direct comparison of the stone with the various color zones illustrated on the selected color chart.

The method of the present invention further recognizes that the resulting parameters of the foregoing steps, while accurately identifying the spectral coloration of a gemstone, often falls short of uniquely disclosing its total colored appearance. When some stones are mounted for ornamental use on a piece of jewelry, for example, the frontal or face appearance thereon can be darker than is necessarily representative of either the particular coloration of the stone or the saturation or strength of the colors. This effect is herein denoted by the term color masking since it tends to mask or block, to some degree, the true composite coloration and/or a view of the stone's interior.

In order to identify this common property of gemstones, a third parameter—the degree or amount of color masking—can be identified. The visual effect of masking on the previously identified combination of main and overlay color parameters can be simulated with the use of a color mask in the form of a masking comparison chart identified in the drawing by the general reference numeral 20. The masking chart comprises a series of sample swatches or patches containing uniformly increasing amounts of masking in a relatively neutral color not included in the predetermined set of primary colors. A preferred neutral color of the masking chart is black—whereby its sample patches comprise uniformly increasing amounts of black from light gray to "pure" black. Because many gemstones contain shades of brown in their composite coloration, a second masking chart comprising patches of relatively increasing amounts of brown can also be utilized as appropriate.

To determine the degree of color masking in a gemstone the invention proposes placement of the appropriate masking chart and the swatch of the proper zone on the previously selected color chart in overlaid relation with respect to each other. For this purpose, either the color comparison charts, or the masking charts, or both, should be printed on a transparent web or surface so that the overlaid combination of color chart and masking chart can be readily viewed against the stone. Relative movement of the selected color chart and the appropriate masking chart to align the previously identified color zone with the various masking swatches will enable a proper identification of the amount of degree of masking present in the gemstone.

Practice of the instant invention in the foregoing manner to identify the main and overlay colors, the respective parameters of overlay level and color zone, and the degree of color masking results in the development of a set of parameters and values that uniquely, accurately and verifiably characterize a gemstone under consideration. In order to further assure uniformity of result, a light source of known spectral characteristics and intensity should be employed. Although it is presently preferred that the lighting comprise a fluorescent source of approximately 5000° K. so as to approximate neutral daylight conditions that are readily repeatable irrespective of available ambient light, alternative sources may be utilized so long as the spectral characteristics of the source are specified in setting forth the results achieved in the practice of the inventive method.

Normally, lighting of the stone from above—so that light enters the stone through the front or top face thereof—will prove sufficient in the practice of the invention. Where, however, the degree of color masking or other factors of colorations prevent an accurate identification of the various parameters to be normally attained, back or side lighting of the stone should be utilized instead.

While the novel method and system herein disclosed results in an identification and specification of parameters and values substantially uniquely and accurately characteristic of the overall colored appearance of a gemstone, a still more complete description of the gemstone constructed around the inventive colored designation method may be achieved by specifying details of various secondary characteristics of the stone. Thus, the brightness of the colored appearance of the stone—on a scale of a selected number of steps from bright to dull—may be specified. An analogy to brightness can be drawn to paints; enamel paints appear as very bright while flat paints are relatively dull, with so-called semi-gloss paints falling between those extremes. Likewise, color photographs can be printed on both glossy paper and on matte paper; the colors are the same in each case, but the apparent brightness of each is clearly different.

Another characteristic of gemstones is their transparency. At one extreme, a stone can be quite transparent, allowing a substantially unobstructed view of its interior from front face to culet. On the other hand, an opaque stone permits virtually no light to pass therethrough and its interior cannot readily be inspected. In a translucent gemstone, only an obstructed view of the stone's interior is possible, and the culet can be examined only from the rear of the stone.

Still another feature of gemstones is their clarity—i.e. whether the stone has inclusions and the degree to which they are readily visible. This characteristic of colored stones can be graded on a predeterminately stepped scale from flawless to extremely included.

Depending upon the type of stone being considered and the depth of analysis and identification required, gradings as to such additional characteristics as cutting, polish, phenomena as asterism, chatoyancy and color change, and proportion and symmetry can also be included in the complete description.

There has thus been described a system and methodology for providing a reliably objective and independently verifiable and accurate specification of the overall colored appearance of a gemstone. The method is unusually simple to carry out and requires little experience with or specific knowledge of gemstones to attain accurate and uniform results. Although the method is specifically described with respect to colored gemstones, it should be recognized and appreciated that the disclosed system by which the overall colored appearance of an object is specified may be readily applied to objects other than gemstones substantially without modification.

In addition, while there have been described and pointed out the fundamental novel features of the invention as applied to a preferred embodiment thereof, it will be understood that various omissions and substitutions and changes in the form and details of the disclosed method may be made by those skilled in the art without departing from the spirit of the invention. It is the intention, therefore, to be limited only as indicated by the scope of the claims appended hereto.

What is claimed is:

1. In a procedure for uniformly and uniquely designating the physical characteristics of a colored gemstone, a method of specifying colors of the gemstone comprising the steps of:

illuminating the gemstone with a light source of predetermined intensity and spectral characteristics so as to enable viewing of at least a portion of the interior of the gemstone;

viewing the illuminated gemstone to identify the main color thereof from among a predetermined set of primary colors situate along the spectrum of visible light;

viewing the illuminated gemstone to identify the overlay color thereof from among said predetermined set of primary colors;

said steps of identifying the main and overlay colors including the step of comparing the illuminated gemstone with a series of color charts comprising said predetermined set of primary colors and mixtures of the primary colors to select the color chart corresponding to the combination of main and overlay colors present in the gemstone;

determining the degree of color masking in the gemstone by overlaying one atop the other a color mask and the selected color chart corresponding to the main and overlay colors of the gemstone and comparing the gemstone with said overlaid combination, said color mask comprising a masking chart containing uniformly increasing amounts of masking in a relatively neutral color not included in said predetermined set of primary colors, and identifying by said comparison the amount of masking which, when overlaid with the selected color chart corresponding to the main and overlay colors of the gemstone, approximates the total colored appearance of the gemstone;

whereby the selected combination of main and overlay colors and of color mask amount uniquely identifies the total color characteristics and appearance of the gemstone such that the gemstone can be readily matched with another, given the elements of the identified combination.

2. In a procedure in accordance with claim 1 wherein each of said color charts of the primary colors and mixtures of the primary colors comprise a series of a selected number of zones of the primary or combination colors of the particular chart, said zones representing uniformly stepped degrees of saturation of the primary color or mixture of the primary colors of said particular chart, said step of comparing the stone with the color charts including identifying by said comparison the zone of coloration of the stone so as to characterize the saturation of the main and overlay color composite.

3. In a procedure in accordance with claim 1, said predetermined set of primary colors comprising red, orange, yellow, green, blue and purple.

4. In a procedure in accordance with claim 3, said predetermined set of primary colors further including cyan.

5. In a procedure in accordance with claim 3, said predetermined set of primary colors further including magenta.

6. In a procedure in accordance with claim 4, said predetermined set of primary colors further including magenta.

7. In a procedure in accordance with claim 1, at least one of said color charts and said masking charts being printed on a transparent surface to facilitate said comparison of the overlaid combination thereof with the gemstone.

8. In a procedure in accordance with claim 1, said light source preferably comprising a fluorescent source of approximately 500° K. so as to approximate neutral daylight conditions that are readily repeatable irrespective of available ambient light.

9. In a procedure in accordance with claim 1, said illumination of the gemstone comprising backlighting the gemstone.

10. In a procedure in accordance with claim 1, the color of said masking being either black or brown.

11. In a procedure in accordance with claim 2, each of said color charts comprising a series of ten zones.

12. In a procedure in accordance with claim 1, further comprising the method step of comparing the gemstone with said selected color chart to determine whether the proportion of overlay to main color present in the gemstone is less than, greater than or substantially equal to such proportion in the selected color chart to thereby identify the overlay level.

13. In a procedure in accordance with claim 2, further comprising the method step of comparing the gemstone with said selected color chart to determine whether the proportion of overlay to main color present in the gemstone is less than, greater than or substantially equal to such proportion in the selected color chart to thereby identify the overlay level.

14. In a procedure in accordance with claim 1, both said color charts and said masking charts being printed on transparent surfaces to facilitate said comparison of the overlaid combination thereof with the gemstone.

* * * * *

UNITED STATES PATENT OFFICE
CERTIFICATE OF CORRECTION

Patent No. 4,527,895         Dated July 9, 1985

Inventor(s) HOWARD RUBIN

It is certified that error appears in the above-identified patent and that said Letters Patent are hereby corrected as shown below:

In Column 5, line 43, change "of degree" to --or degree--.

In Claim 8, line 3, change "500°" to --5000°--.

Signed and Sealed this

Twelfth Day of August 1986

[SEAL]

Attest:

Attesting Officer

DONALD J. QUIGG

Commissioner of Patents and Trademarks